United States Patent
Denli et al.

(10) Patent No.: US 11,693,139 B2
(45) Date of Patent: Jul. 4, 2023

(54) AUTOMATED SEISMIC INTERPRETATION-GUIDED INVERSION

(71) Applicant: ExxonMobil Technology and Engineering Company, Spring, TX (US)

(72) Inventors: Huseyin Denli, Basking Ridge, NJ (US); Dimitar Trenev, Sleepy Hollow, NY (US); Cody J. Macdonald, Houston, TX (US); Diego Hernandez, Tomball, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 678 days.

(21) Appl. No.: 16/685,312

(22) Filed: Nov. 15, 2019

(65) Prior Publication Data

US 2020/0183031 A1    Jun. 11, 2020

Related U.S. Application Data

(60) Provisional application No. 62/777,941, filed on Dec. 11, 2018.

(51) Int. Cl.
*G01V 1/28* (2006.01)
*G01V 1/30* (2006.01)

(52) U.S. Cl.
CPC .............. *G01V 1/282* (2013.01); *G01V 1/301* (2013.01); *G01V 2210/514* (2013.01); *G01V 2210/66* (2013.01)

(58) Field of Classification Search
CPC .. G01V 1/282; G01V 1/301; G01V 2210/514; G01V 2210/66

(Continued)

(56) References Cited

U.S. PATENT DOCUMENTS 5,444,619 A    8/1995   Hoskins et al.
5,940,777 A    8/1999   Keskes
(Continued)

FOREIGN PATENT DOCUMENTS

EP          0 561 492 B1     1/1998
WO    WO 2017/188858 A1    11/2017

OTHER PUBLICATIONS

Akcelik et al. (2011) "Multiparameter Material Model and Source Signature Full Waveform Inversion," *SEG San Antonio 2011 Annual Meeting*, pp. 2406-2410.

(Continued)

*Primary Examiner* — Michael P Nghiem
(74) *Attorney, Agent, or Firm* — Lempia Summerfield Katz LLC

(57) ABSTRACT

A method and apparatus for seismic analysis include obtaining an initial geophysical model and seismic data for a subsurface region; producing a subsurface image of the subsurface region with the seismic data and the geophysical model; generating a map of one or more geologic features of the subsurface region by automatically interpreting the subsurface image; and iteratively updating the geophysical model, subsurface image, and map of geologic features by: building an updated geophysical model based on the geophysical model of a prior iteration constrained by one or more geologic features from the prior iteration; imaging the seismic data with the updated geophysical model to produce an updated subsurface image; and automatically interpreting the updated subsurface image to generate an updated map of geologic features. The method and apparatus may also include post-stack migration, pre-stack time migration, pre-stack depth migration, reverse-time migration, gradient-based tomography, and/or gradient-based inversion methods.

21 Claims, 12 Drawing Sheets

(58) Field of Classification Search
USPC .......................................................... 702/16
See application file for complete search history.

(56) References Cited

U.S. PATENT DOCUMENTS

| | | | |
|---|---|---|---|
| 6,374,185 | B1 | 4/2002 | Taner et al. |
| 6,438,493 | B1 | 8/2002 | West et al. |
| 6,662,112 | B2 | 12/2003 | Eastwood et al. |
| 6,735,526 | B1 | 5/2004 | Meldahl et al. |
| 7,844,402 | B2 | 11/2010 | Klein et al. |
| 8,055,026 | B2 | 11/2011 | Pedersen |
| 9,366,772 | B2 | 6/2016 | Imhof |
| 9,489,769 | B2 | 11/2016 | Luneburg et al. |
| 9,618,639 | B2 | 4/2017 | Witte et al. |
| 2004/0199330 | A1* | 10/2004 | Routh ............... G01V 1/28 702/14 |
| 2012/0195165 | A1 | 8/2012 | Vu et al. |
| 2013/0338978 | A1* | 12/2013 | Zhang ............... G06F 30/20 703/2 |
| 2015/0234070 | A1 | 8/2015 | Xu et al. |
| 2017/0364795 | A1 | 12/2017 | Anderson et al. |
| 2018/0106917 | A1 | 4/2018 | Osypov et al. |
| 2018/0120461 | A1 | 5/2018 | Allegar et al. |
| 2018/0275300 | A1 | 9/2018 | Akcelik et al. |
| 2018/0306940 | A1 | 10/2018 | Basler-Reeder et al. |
| 2019/0064378 | A1 | 2/2019 | Liu et al. |
| 2019/0064389 | A1* | 2/2019 | Denli ............... G06N 3/04 |
| 2019/0162868 | A1 | 5/2019 | Salman et al. |
| 2019/0169962 | A1 | 6/2019 | Aqrawi et al. |
| 2019/0250294 | A1 | 8/2019 | Salman |
| 2019/0383965 | A1 | 12/2019 | Salman et al. |
| 2019/0391295 | A1 | 12/2019 | Salman et al. |
| 2020/0066035 | A1* | 2/2020 | Tewari ............... G06F 30/23 |

OTHER PUBLICATIONS

Andersson et al. (2004) "T-H-M-C Modelling of Rock Mass Behaviour—1:The Purposes, The Procedures and the Products", *Geo-Engineering*, pp. 433-438.
Arava-Polo et al. (2017) "Automated fault detection without seismic processing," *The Leading Edge*, vol. 36, pp. 208-214.
Arjovsky et al. (2017) "Wasserstein GAN", pp. 1-32.
Aster et al. (2013) "Tikhonov Regularization", *Parameter Estimation and Inverse Problems*, pp. 93-127.
Baan et al. (2000) "Neural networks in geophysical applications", *Geophysics*, vol. 65, No. 4, pp. 1032-1047.
Backus et al. (1967) "Numerical applications of a formalism for geophysical inverse problems", *Geophysical Journal of the Royal Astronomical Society*, vol. 13, pp. 247-276.
Bellemare et al. (2017) "The Cramer Distance as a Solution to Biased Wasserstein Gradients", pp. 1-20.
Chan et al. (2017) "Parametrization and the Generation of Geological Models with Generative Adversarial Networks", pp. 1-28.
Chave et al. (2012) "Introduction to the magnetotelluric method", *The magnetoelluric method: theory and practice*, Cambridge University Press, pp. 1-18.
Chen et al. (2016) "InfoGAN: Interpretable Representation Learning by Information Maximizing Generative Adversarial Nets", *30th Conference on Neural Information Processing Systems*, pp. 1-9.
Cubuk et al. (2018) "AutoAugment: Learning Augmentation Policies from Data", pp. 1-14.
Denli et al. (2013) "Full-Wavefield Inversion for Acoustic Wave Velocity and Attenuation," *SEG Houston 2013 Annual Meeting*, pp. 980-985.
Duchi et al. (2011) "Adaptive subgradient methods for online learning and stochastic optimization", *Journal of Machine Learning Research*, vol. 12, pp. 2121-2159.
Etgen et al. (2009) "An overview of depth imaging in exploration geophysics", *Geophysics*, Vo.74, pp. WCA5-WCA17.
Etgen et al. (2010) "Introduction to this special section: Reverse time migration" *The Leading Edge*, vol. 29, p. 1363.

Fedus et al. (2018) "Many Paths to Equilibrium: GANs Do Not Need to Decrease a Divergence at Every Step", *International Conference on Learning Representation*, pp. 1-21.
Gibson et al. (2003) "Automatic Fault Detection for 3D Seismic Data," *DICTA* pp. 821-830.
Goodfellow et al. (2014) "Generative Adversarial Nets," *Advances in Neural Information Processing Systems 27, NIPS*, pp. 1-9.
Guillen et al. (2015) "Supervised learning to detect salt body", *SEG New Orleans 2015 Annual Meeting*, pp. 1826-1829.
Gulrajani et al. (2017) "improved Training of Wasserstein GANs", *CoRR*, pp. 1-11.
Dave Hale (2013) "*Methods to compute fault images, extract fault surfaces, and estimate fault throws from 3D seismic images*", *Geophysics*, vol. 78, pp. O33-O43.
Hami-Eddine et al. (2012) "Anomaly Detection using dynamic Neural Networks, classification of prestack data", *SEG Las Vegas 2012 Annual Meeting*, pp. 1-5.
Hami-Eddine et al. (2015) "A new technique for lithology and fluid content prediction from prestack data: An application to a carbonate reservoir", Interpretation, vol. 3, No. 1, pp. S19-S32.
He et al. (2016) "Deep Residual Learning for Image Recognition," *2016 IEEE Conference on Computer Vision and Pattern Recognition (CVPR)*, pp. 770-778.
Huang et al. (2017) "A scalable deep learning platform for identifying geologic features from seismic attributes", *The Leading Edge*, vol. 36, pp. 249-256.
Isola et al. (2018) "Image-to-Image Translation with Conditional Adversarial Networks", *2017 IEEE Conference on Computer Vision and Pattern Recognition*, pp. 5967-5976.
Janoos et al. (2014) "Multi-scale graphical models for spatio-temporal processes", *Advances in Neural Information Processing Systems*, vol. 27, pp. 316-324.
Jiang et al. (2016) "Detecting prospective structures in volumetric geo-seismic data using deep convolutional neural networks," Poster presented at the annual foundation council meeting of the Bonn-Aachen International Center for Information Technology (b-it), p. 1.
Ying Jiang (2017) "*Detecting Geological Structures in Seismic Volumes Using Deep Convolutional Neural Networks*", Master Thesis from Rheinish-Westfalische Technische Hochschule Aachen, p. 1-76.
Kingma et al. (2015) "*Adam: A Method for Stochastic Optimization,*" *ICLR-Conference Paper*, pp. 1-15.
Koenderink et al. (1994) "Two-plus-one-Dimensional differential geometry," *Pattern Recognition Letters*, vol. 15, pp. 439-443.
Komatitsch et al. (2000) "The spectral element method for three-dimensional seismic wave propagation" *SEG Technical Program Expanded Abstracts*, pp. 2197-2200.
Krizhevsky et al. (2012) "ImageNet classification with deep convolution neural networks", *NIPS*, pp. 1-9.
LeCun, Y. (2015) "Deep Learning," *Nature*, vol. 521, pp. 436-444.
Lewis et al. (2017) "Deep learning prior models from seismic images for full-waveform inversion", *SEG Technical Program Expanded Abstracts*, pp. 1512-1517.
Leveque, R. J. (2002) "Finite volume methods for hyperbolic problems", Cambridge Texts in Applied Mathematics, Cambridge University Press, pp. 64-85.
Li et al. (2015) "Gravity and magnetic methods in mineral and oil & gas exploration and production", *EAGE*, pp. 15-24.
Lin et al. (2013) "A wavelet-based model compression method for three-dimensional electromagnetic data inversion", *SEG Houston 2013 Annual Meeting*, pp. 707-712.
Lin et al. (2017) "Building Subsurface Velocity Models with Sharp Interfaces Using Interface-Guided Seismic Full-Waveform Inversion", *Proceedings: Thirty-Ninth Workshop on Geothermal Reservoir Engineering*, pp. 1-8.
Long et al. (2015) "Fully Convolutional Networks for Semantic Segmentation," *Proceedings of the IEEE Computer Society Conference on Computer Vision and Pattern Recognition*, pp. 3431-3440.
Ma et al. (2012) "Image-guided sparse-model full waveform inversion", *Geophysics*, vol. 77, pp. R189-R198.

(56) References Cited

OTHER PUBLICATIONS

Macias et al. (2000) "Artificial neural networks for parameter estimation in geophysics", *Geophysical Prospecting*, vol. 48, pp. 21-47.
Marroquin et al. (2009) "A visual data-mining methodology for seismic facies analysis: Part 1—testing and comparison with other unsupervised clustering methods", *Geophysics*, vol. 74, pp. P1-P11.
Miller et al. (2001) "Seismic interpretation and processing applications", *Handbook of Geophysical Exploration*, pp. 101-118.
Moczo et al. (2007) "The finite-difference time-domain method for modeling of seismic wave propagation", *Advances in Geophysics*, vol. 48, pp. 421-516.
Mun et al. (2017) "Comparison of objective functions in CNN-based prostate magnetic resonance image segmentation", *2017 IEEE International Conference on Image Processing (ICIIP)*, pp. 3859-3863.
D. Oldenburg (1990) "Inversion of electromagnetic data: An overview of new techniques", *Surveys in Geophysics*, vol. 11 pp. 231-270.
PaleoScan Software available from Eliis, http://www.eliis.fr/products/paleoscan-software, downloaded Jul. 3, 2018, p. 1-2.
G. Partyka, (2017) "Seismic processing and analysis in service of interpretation", *SEG Technical Program Expanded Abstracts*, pp. 5261-5266.
Regone et al. (2017) "Geologic model building in SEAM Phase II—Land seismic challenges", The Leading Edge, pp. 738-749.
Ronneberger et al. (2015) "U-Net: Convolutional Networks for Biomedical Image Segmentation," *Medical Image Computing and Computer-Assisted Intervention (MICCAI)*, Springer, LNCS, vol. 9351, pp. 234-241.
Roth et al. (1994), "Neural networks and inversion of seismic data", *Journal of Geophysical Research*, vol. 99, pp. 6753-6768.
Sava et al. (2009) "Overview and classification of wavefield seismic imaging methods" *The Leading Edge*, vol. 28, pp. 170-183.
Scnaefer et al. (2006) "Image deformation using moving least squares", *ACM Transactions on Graphics* vol. 25, pp. 533-540.
Schiesser (1991) "A PDE Second-Order in Time: The Hyperbolic Wave Equation", *The Numerical Method of Lines: Integration of Partial Differential Equations*, pp. 70-75.
Schiesser (1991) "Spatial Differentiation", *The Numerical Method of Lines: Integration of Partial Differential Equations*, pp. p97-122.
Simonyan, K. (2015) "Very Deep Convolutional Networks for Large-Scale Image Recognition," *ICLR 2015 Conference Paper*, pp. 1-15.
T. Smith (2017) "Geobody interpretation through multiattribute surveys, natural clusters and machine learning", *SEG International Exposition and 87th Annual Meeting*, pp. 2153-2157.
Srivastava et al. (2014) "Dropout: A simple way to prevent neural networks from overfitting", *Journal of Machine Learning Research*, vol. 15, pp. 1929-1958.
Tarantola (2005) "Inverse problem theory and methods for model parameter estimation: Chapter 3 The Least-Squares Criterion", *SIAM* pp. 57-64.
Tschannen et al. (2017) "Facies classification from well logs using an inception convolutional network" XP080767099.
Vieux et al. (2009) "An overview of full-waveform inversion in exploration geophysics", *Geophysics*, vol. 74, pp. WCC1-WCC26.
Veiilard et al. (2018) "Fast 3D Seismic Interpretation with Unsupervised Deep Learning: Application to a Potash Network in the North Sea", *80th EAGE Conference & Exhibition*, pp. 1-5.
Waldeland et al. (2018) "Convolutional neural networks for automated seismic interpretation", *The Leading Edge*, pp. 529-537.
Wang et al. (2008) "Advances in velocity model-building technology for subsalt imaging", *Geophysics*, vol. 73, pp. VE173-VE181.
Zamir et al. (2018) "Taskonomy: Disentangling Task Transfer Learning", *Proceedings of the IEEE Conference on Computer Vision an Pattern Recognition*, pp. 3712-3722.
Zhang (2008) "Incorporating Geological Conceptual Models and Interpretations into Reservoir Modeling Using Multiple-Point Geostatistics", *Earth Science Frontiers*, vol. 15, pp. 26-35.
Zhu et al. (2017) "Toward Multimodal Image-to-Image Translation", 31$^{st}$ *Conference on Neural Information Processing Systems*, pp. 1-12.
Zou et al. (2004) "Statistical validation of image segmentation quality based on a spatial overlap index", *Academy of Radiology*, vol. 11, pp. 178-189.
Lines et al. (2004) "Fundamentals of Geophysical Interpretation", Chapter 15, Geophysical Monograph Series, Society of Exploration Geophysicists, pp. 137-144.
Lines et al. (2004) "Fundamentals of Geophysical Interpretation", Chapter 16, Geophysical Monograph Series, Society of Exploration Geophysicists, pp. 145-158.
Lines et al. (2004) "Fundamentals of Geophysical Interpretation", Chapter 17, Geophysical Monograph Series, Society of Exploration Geophysicists, pp. 159-170.
Lines et al. (2004) "Fundamentals of Geophysical Interpretation", Chapter 18, Geophysical Monograph Series, Society of Exploration Geophysicists, pp. 171-180.
Yilmaz (2001) "Seismic data analysis: Processing, inversion, and interpretation of seismic data", Investigations in Geophysics, Society of Exploration Geophysicists, pp. 463-476.
Zhang et al. (2016) "Automated Geophysical Feature Detection with Deep Learning," GPU Technology Conference, pp. 1-22.
Hesthaven et al. (2007), "Nodal Discontinuous Galerkin Methods: Algorithms, Analysis, and Applications", Chapter 2 The key ideas, Springer, Texts in Applied Mathematics, pp. 19-41.
Nocedal et al. (2006) "Numerical optimization", Chapter 2 "Fundamentals of Unconstrained", Springer Series in Operations Research and Financial Engineering, pp. 10-29.

\* cited by examiner

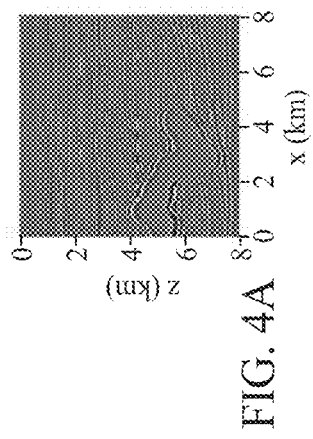
FIG. 4A
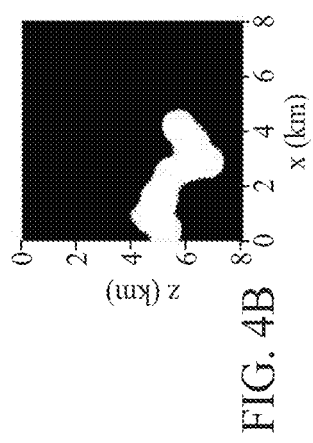
FIG. 4B
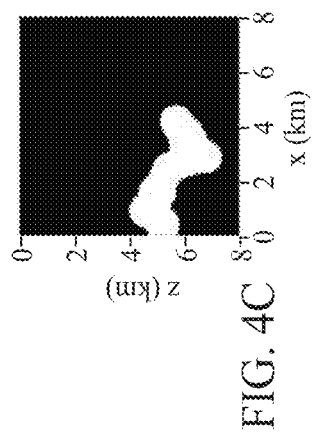
FIG. 4C
FIG. 5A
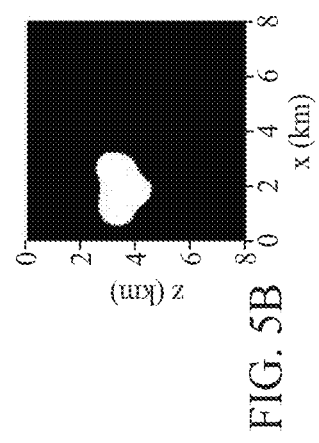
FIG. 5B
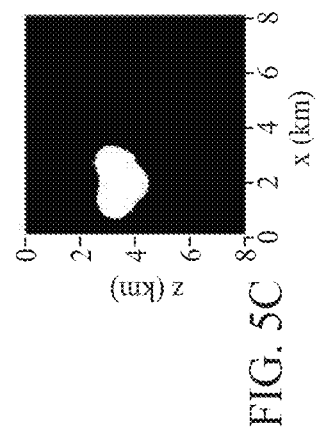
FIG. 5C

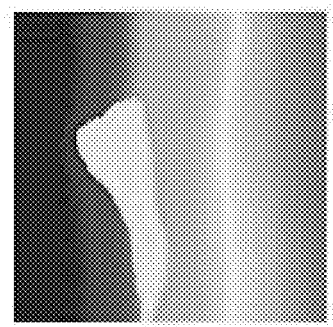
FIG. 12A
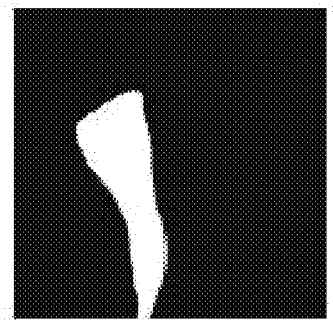
FIG. 12B
FIG. 12C
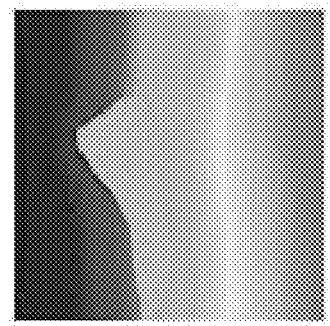
FIG. 13A
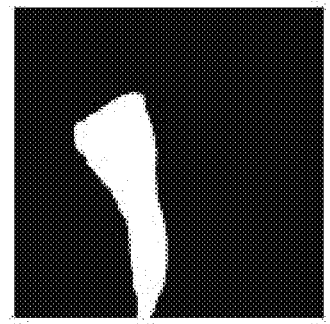
FIG. 13B
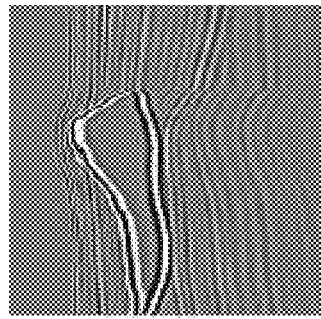
FIG. 13C

AUTOMATED SEISMIC INTERPRETATION-GUIDED INVERSION

CROSS-REFERENCE TO RELATED APPLICATION

This application claims the benefit of U.S. Provisional Application 62/777,941 filed Dec. 11, 2018 entitled "AUTOMATED SEISMIC INTERPRETATION-GUIDED INVERSION", the entirety of which is incorporated by reference herein.

FIELD

This disclosure relates generally to the field of geophysical prospecting and, more particularly, to seismic prospecting for hydrocarbon management and related data processing. Specifically, exemplary embodiments relate to methods and apparatus for improving computational efficiency by using automated seismic interpretation to guide inversion analysis.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An important goal of hydrocarbon prospecting is to accurately model subsurface geologic structures. For example, seismic data may be gathered and processed to generate subsurface models that reveal geologic structure. Seismic prospecting is facilitated by acquiring raw seismic data during performance of a seismic survey. During a seismic survey, one or more seismic sources generate seismic energy (e.g., a controlled explosion, or "shot") which is delivered into the earth. Seismic waves are reflected from subsurface structures and are received by a number of seismic sensors or "receivers" (e.g., geophones). The seismic data received by the seismic sensors is processed in an effort to create an accurate mapping of the subsurface region. The processed data is then examined (e.g., analysis of images from the mapping) with a goal of identifying subsurface structures that may contain hydrocarbons.

Geophysical data (e.g., acquired seismic data, reservoir surveillance data, etc.) may be analyzed to develop subsurface models. For example, one or more inversion procedures may be utilized to analyze the geophysical data and produce models of rock properties and/or fluid properties. Generally, inversion is a procedure that finds a geophysical parameter model (e.g., a velocity model, in which each unit or cell within the model has associated with it a value indicating velocity with which seismic waves would travel through a portion of the subsurface corresponding to that cell), or a collection of models, which, through simulation of some physical response to those parameters, can reproduce to a chosen degree of fidelity a set of measured data. Inversion may be performed, for example, on seismic data to derive a model of the distribution of elastic-wave velocities within the subsurface of the earth. For example, Full Wavefield Inversion (FWI) simulates seismic waves as induced in the field, and attempts to match the measured seismic response. FWI tends to be a very challenging computational problem because the amount of data to be simulated is large (comprising a full 3D seismic acquisition), and simulated seismic waves are sensitive to not only a large volume of the earth, but to relatively fine-scale variations in properties within that volume. Therefore, naive parameterization of a subsurface model (e.g., by uniform discretization) may require many volume elements (voxels) of uniform elastic velocities to match simulated data to the observed seismic data.

Often, seismic analysis is performed in a sequential fashion: information processed in a first stage is passed to the following stage, and no feedback information from the following stage is utilized in the first one. For example, seismic analysis may include (1) subsurface geophysical model building (e.g., inversion), (2) migration procedures (also called migration imaging or seismic imaging) and (3) interpretation. Subsurface model building involves an inversion process, such as seismic tomography or FWI, to build models of subsurface geophysical parameters (e.g., compressional velocity, shear velocity, anisotropy, and attenuation) using seismic data. Migration procedures generally use the inverted geophysical parameter models to geometrically relocate a recorded event (e.g. reflection or refraction signal observed over wavelength) from the recording coordinates to the subsurface spatial position where the event originated. Typically, the recorded events originate at structural interfaces or boundaries formed by geologic processes, such as sedimentation, folding, faulting, and/or fracturing. These images may be interpreted (typically by an expert or a team of experts) using prior geological knowledge and/or rock physics models. For example, the rock physics models may be calibrated with analog well logs to extract structural, stratigraphic, and/or lithologic information about the subsurface region.

However, knowledge used in the interpretation stage is not typically incorporated into the model-building stage. The accuracy of seismic images, and therefore the accuracy of interpretation, depends on the accuracy of the geophysical parameter models. Errors in the geophysical parameter models propagate into migration images and interpretation products. The conventionally-staged process of seismic analysis often produces models which, by the time geologic interpretation has been applied, no longer satisfy the physics-based data constraints (from the inversion). This tends to result in a time-consuming endeavor (e.g., on the order of 6 months to years), with no guarantee that the two competing approaches will converge to one agreed-upon model. Therefore, the process is expensive, slow, subjective, and possibly produces results which are not fully consistent with the observed data.

Geophysical parameter models built using FWI may be inaccurate and inefficient due to a number of reasons, including non-uniqueness (which may lead to solutions that do not make geologic sense in light of the data), lack of convexity in the objective function, and computational costs. Non-uniqueness is a pervasive characteristic of geophysical inversion. Non-uniqueness may be particularly pronounced when inverting for multiple geophysical parameters simultaneously (e.g. multi-parameter FWI). Seismic surveys typically acquire data at locations remote from the subsurface region of interest and at narrow frequency bands due to the physical limitations of surveying equipment. These limitations lead to incomplete information, inadequate resolution, and large uncertainty about the subsurface region of interest. While additional data, such as the geological knowledge of seismic interpretation experts, could mitigate non-uniqueness, current methods do not typically offer a framework of incorporating seismic interpretation knowledge into inversion procedures.

Also, the large-scale nature of the geophysical inversion problems precludes the use of global optimization techniques, dictating instead the use of local-gradient-based techniques. The objective function of a geophysical inversion problem may not be convex due to the oscillatory nature of the measured seismic signal. Gradient-based optimization methods applied to a non-convex functional may be sensitive to the initial subsurface physical property model. If the initial model of an inversion is not in a convex neighborhood of the global minimum, the gradient-based optimization methods tend to converge to an undesired local minimum. This issue becomes more pronounced when large geologic structures, such as salt formations, exist in the subsurface region: velocity anomalies (indicative of subsurface geologic structures) with complex shapes and/or high-contrast, sharp boundaries may severely distort seismic waves and/or scatter seismic energy.

More efficient equipment and techniques to generate subsurface models would be beneficial.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, for the disclosure may admit to other equally effective embodiments and applications.

FIGS. 4A, 5A, 6A, 7A, and 8A illustrate examples of samples of subsurface images.

FIGS. 4B, 5B, 6B, 7B, and 8B illustrate examples of manual interpretations of salt anomalies from the respective FIGS. 4A, 5A, 6A, 7A, and 8A.

FIGS. 4C, 5C, 6C, 7C, and 8C illustrate examples of automated interpretations of the respective FIGS. 4A, 5A, 6A, 7A, and 8A.

FIGS. 10-15 illustrate inversion convergence according to disclosed methods.

FIGS. 10A, 11A, 12A, 13A, 14A, and 15A illustrate examples of subsurface images after 5, 10, 20, 30, 40, and 50 iterations, respectively. FIGS. 10B, 11B, 12B, 13B, 14B, and 15B illustrate examples of interpreted geobody shapes after 5, 10, 20, 30, 40, and 50 iterations, respectively. FIGS. 10C, 11C, 12C, 13C, 14C, and 15C illustrate examples of velocity models generated according to Automated Seismic Interpretation (ASI)—guided inversion after 5, 10, 20, 30, 40, and 50 iterations, respectively.

DETAILED DESCRIPTION

Figure 1A:
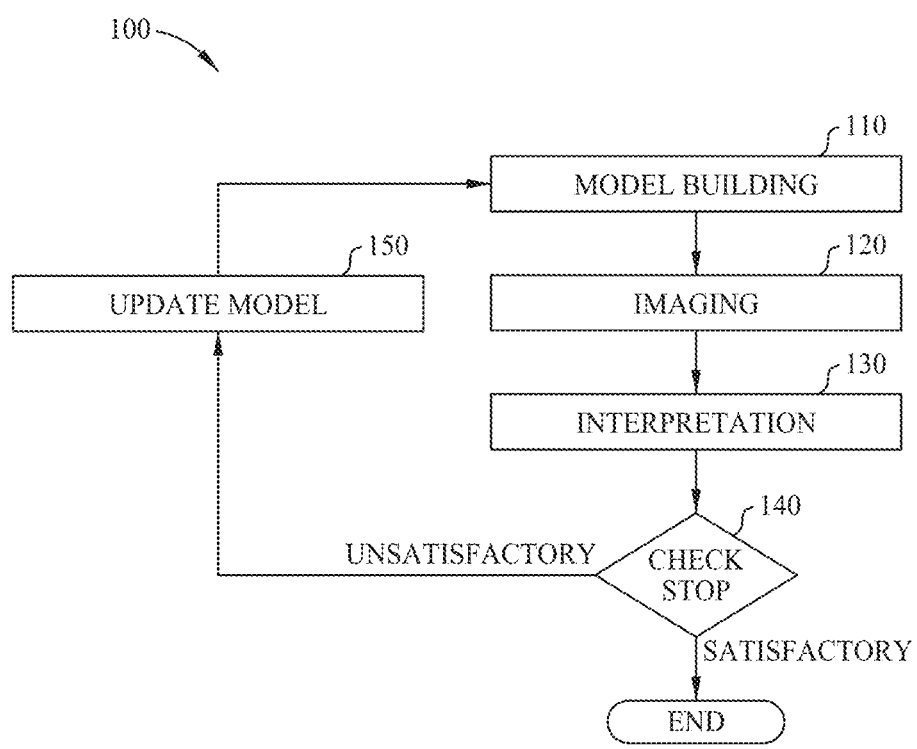
FIG. 1A illustrates an exemplary method according to embodiments disclosed herein.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

The term "seismic data" as used herein broadly means any data received and/or recorded as part of the seismic surveying process, including particle displacement, velocity and/or acceleration, pressure and/or rotation, wave reflection, and/or refraction data. "Seismic data" is also intended to include any data or properties, including geophysical properties such as one or more of: elastic properties (e.g., P and/or S wave velocity, P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended. "Seismic data" may also include data derived from traditional seismic (i.e., acoustic) data sets in conjunction with other geophysical data, including, for example, gravity plus seismic; gravity plus electromagnetic plus seismic data, etc. For example, joint-inversion utilizes multiple geophysical data types.

As used herein, inversion in general, and more specifically Full Wavefield Inversion ("FWI"), refer to geophysical methods which are used to estimate subsurface properties (such as velocity or density). FWI is known to be advanced for its higher resolution and more accurate physics compared to conventional methods. The fundamental components of FWI can be described as follows: using a starting subsurface physical properties model, synthetic seismic data are generated by solving a wave equation (e.g., acoustic or elastic wave equation) using a numerical scheme (e.g., finite-difference, finite-element, etc.). The synthetic seismic data are compared with the field seismic data, and, using the differences between the two, the value of an objective function is calculated. To minimize the objective function, a modified subsurface model is generated which is used to simulate a new set of synthetic seismic data. This new set of synthetic seismic data is compared with the field data to recalculate the value of the objective function. An objective function optimization procedure is iterated by using the new updated model as the starting model for finding another search direction, which will then be used to perturb the model in order to better explain the observed data. The process continues until an updated model is found that satisfactorily explains the observed data. A global or local optimization method can be used to minimize the objective function and to update the subsurface model. Commonly used local objective function optimization methods include, but are not limited to, gradient search, conjugate gradients, quasi-Newton, Gauss-Newton, and Newton's method. Commonly used global methods included, but are not limited to, Monte Carlo or grid search. Inversion may also refer to joint inversion with multiple types of data used in conjunction.

The terms "velocity model," "density model," "physical property model," or other similar terms as used herein refer to a numerical representation of parameters for subsurface regions. Generally, the numerical representation includes an array of numbers, typically a 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which ray paths obeying Snell's law can be traced. A geologic model may be represented in volume elements (voxels), in a similar way that a photograph is represented by picture elements (pixels). As discussed below, in some embodiments, such numerical representations may be shape-based or functional forms in addition to, or in lieu of, cell-based numerical representations.

As used herein, "hydrocarbon management" or "managing hydrocarbons" includes any one or more of the following: hydrocarbon extraction; hydrocarbon production, (e.g., drilling a well and prospecting for, and/or producing, hydrocarbons using the well; and/or, causing a well to be drilled to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.). Hydrocarbon management may include reservoir surveillance and/or geophysical optimization. For example, reservoir surveillance data may include, well production rates (how much water, oil, or gas is extracted over time), well injection rates (how much water or $CO_2$ is injected over time), well pressure history, and time-lapse geophysical data. As another example, geophysical optimization may include a variety of methods geared to find an optimum model (and/or a series of models which orbit the optimum model) that is consistent with observed/measured geophysical data and geologic experience, process, and/or observation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, a "gather" refers to a display of seismic traces that share an acquisition parameter. For example, a common midpoint gather contains traces having a common midpoint, while a common shot gather contains traces having a common shot.

As used herein, the term "geobody" refers to a set of patterns (e.g., seismic facies, amplitude anomaly) observed in an image indicative of a geologic structure. Generally, geologic structures are understood to be three-dimensional portions of a subsurface region, such as stratigraphic layers, sedimentary layers, salt domes or bodies, carbonate build-ups, channel systems, faults, shale diapirs, hydrocarbon accumulations, similar subsurface structures, and/or parts thereof. A geobody may be a contiguous or semi-contiguous collection of cells or voxels in a geologic model.

As used herein, the terms "interface" and "boundary" will be used interchangeably to refer to space or locations between two adjacent geobodies. For example, an interface may separate geobodies that are representative of different sedimentary layers. At an interface between geobodies, at least one geophysical parameter value (such as velocity, density, attenuation) may change in a discontinuous manner. In some embodiments, an interface may have a zero width or a substantially-zero width (e.g., less than one voxel wide). In some embodiments, an interface may have a very narrow width, for example, no more than several voxels wide.

As used herein, the term "geologic feature" is used to refer to either a geobody or an interface.

If there is any conflict in the usages of a word or term in this specification and one or more patent or other documents that may be incorporated herein by reference, the definitions that are consistent with this specification should be adopted for the purposes of understanding this disclosure.

One of the many potential advantages of the embodiments of the present disclosure is enhanced automation of procedures for generating subsurface models. Such automation may accelerate the generation of subsurface models, reduce subjective bias or error, and reduce the geoscience workforce's exposure to ergonomic health risks (e.g., exposure to repetitive tasks and injuries therefrom). Another potential advantage includes converting geologic rules, concepts, patterns, and experience into finite computer code. Another potential advantage includes providing a unified mathematical framework by which both physics-based data constraints and geologic concepts are satisfied by a single procedure. Another potential advantage includes improvement in speed, objectivity, and accuracy of the seismic analysis process. For example, by speeding up the search for valid models (e.g., during FWI), embodiments may enable the discovery of multiple data-consistent and geologically reasonable models. Embodiments of the present disclosure can thereby be useful in the discovery and/or extraction of hydrocarbons from subsurface formations.

FIG. 1A illustrates an exemplary seismic analysis method 100 according to embodiments disclosed herein. Broadly speaking, method 100 builds on and improves existing seismic analysis methods. For example, similar to existing methods, method 100 may include subsurface geophysical model building at block 110, imaging procedures at block 120, and interpretation at block 130. However, method 100 improves upon existing methods by implementing new procedures to mitigate many deficiencies. For example, method 100 includes an iterative procedure that checks stopping criteria at block 140, following the interpretation at block 130. When the stopping criteria have not been met, models are updated at block 150 (e.g., with geobody-constrained inversion), and control returns to the model building at block 110. The models may thus be informed by the additional information provided by interpretation, mitigating non-uniqueness concerns. Such iterative procedures had previously been unavailable due to the extremely large amount of data and laborious interpretation tasks—thereby long turn-around times and enormous computation resources—inherent in existing model-building procedures (e.g., FWI). For example, with model building turn-around times of 6 months to years, it would be impracticable to iterate even a couple of times with existing model-building procedures. Method 100 mitigates these concerns with more efficient model-building techniques at block 110 (e.g., shape-constrained inversion). Additionally, new interpretation procedures (e.g., Automated Seismic Interpretation) at block 130 may improve consistency, accuracy, and objectivity of outcomes by automating the interpretation procedures. Method 100 thereby includes both new procedures and new uses of existing procedures to improve upon existing methods and mitigate many deficiencies.

The general method 100 presented in FIG. 1A may be described in more detail as follows. At the outset, an initial geophysical model (e.g., a seismic velocity model) may be obtained. For example, the initial geophysical model may be a rough estimate of values (e.g., compressional velocity, shear velocity, density, anisotropy, or porosity) as a function of depth in the subsurface region. The initial geophysical model may be obtained from a data library or previous analysis of the subsurface region or geological basin. The initial geophysical model may be a voxelized or cell-based representation of the subsurface region. During the initial iteration (the zeroth iteration), obtaining the initial geophysical model may substitute for the model-building procedures of block 110 in method 100.

Also during the initial iteration, method 100 may include using seismic data with the initial geophysical model to produce subsurface images (e.g., migration images). In some embodiments, the subsurface images may be produced by migrating the seismic data with the initial geophysical model. In some embodiments, the subsurface images may be produced with other procedures, such as seismic tomography and/or inversion gradients. For example, inversion gradient image may be based on short-offset (e.g., 1-2 kilometer) impedance gradients, short-offset density gradients, and/or short-offset reflectivity gradients. In some embodiments, the seismic data may be newly acquired by a seismic survey. In some embodiments, the seismic data may be obtained from a data library (e.g., a library of data from previous seismic surveys). In some embodiments, the seismic data may be synthetic data generated by simulations based on the subsurface region. In some embodiments, the seismic data may include portions from any two or more (e.g., including all) of these data sources. The seismic data may be, for example, seismic shot gathers, and the initial geophysical model may be a subsurface velocity model. The imaging procedures may include, for example, post-stack migration, pre-stack time migration, pre-stack depth migration, and/or reverse time migration. During the initial iteration, using seismic data with the initial geophysical model to produce subsurface images may substitute for the imaging procedures of block 120 in method 100.

Figure 2C:
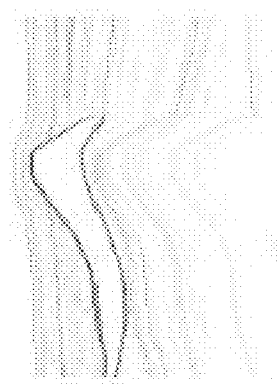
FIG. 2C illustrates a reflectivity image of the geobody from FIG. 2A.
Figure 2B:
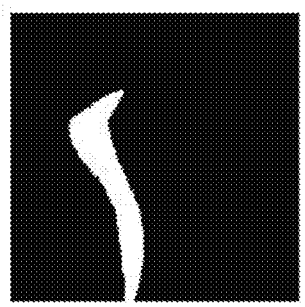
FIG. 2B illustrates a geobody extracted from FIG. 2A.
Figure 2A:
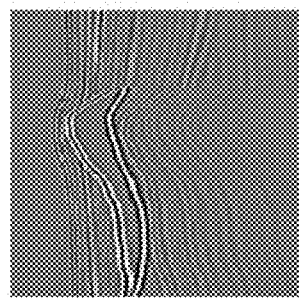
FIG. 2A illustrates an exemplary subsurface image obtained with an initial velocity model.

Method 100 continues at block 130 where the subsurface images are interpreted. In some embodiments, Automated Seismic Interpretation (ASI) (also referred to herein as automatically interpreting such subsurface images) is utilized to interpret the subsurface images. Such automatic interpretation may, for instance, produce maps of geologic features (i.e., geobodies and/or interfaces) in the subsurface region. For example, FIG. 2A illustrates an example of a subsurface image. FIG. 2B illustrates a geobody (e.g., a salt body) identified in and interpreted from FIG. 2A. FIG. 2C illustrates a reflectivity image of the salt body from FIG. 2B. In some embodiments, the interpretation of block 130 includes automatic interpretation (e.g., via ASI) that maps relationships between the output of any imaging procedure and the geobodies in subsurface spatial coordinates. Suitable ASI systems and methods are further described hereinbelow, and also are described in co-pending U.S. application Ser. No. 16/059,567 (U.S. Publication No. US2019-0064378, now U.S. Pat. No. 11,119,235), entitled "Automated Seismic Interpretation Using Fully Convolutional Neural Networks," filed Aug. 9, 2018, which is herein incorporated by reference.

Method 100 continues by checking stopping criteria at block 140. For example, an objective function (e.g., Equation (1) (below)) may be tested for optimization/minimization. When the stopping criteria have not been met, and/or the value of the objective function is unsatisfactory, the method 100 continues by iterating from the check stop of block 140 to the model building of block 110. During each iteration, the geophysical model is updated at block 150 to be consistent with the geobodies from the interpretation of block 130. Note that the geophysical model is no longer fully cell-based, but rather includes at least one geobody. The model is also updated to be consistent with the seismic data (which remains cell-based). During at least some of the iterations following the initial iteration, the model building of block 110 includes inversion (e.g., FWI, seismic tomography) constrained with the shape of the at least one geobody. In some embodiments, user input may determine the number of iterations (e.g., 10, 20, 50, or 100 iterations). In some embodiments, the iterations may continue as long as the objective function continues to substantially decrease (e.g., by at least 5%) with each iteration. In some embodiments, the iterations may continue until the objective function is reduced to the noise floor in the seismic data. In some embodiments, the iterations may continue as long as the model continues to substantially change with each iteration. For example, the model may be qualitatively inspected by a user (e.g., a geoscientist). Visual inspection may ensure the results carry geologic and/or geophysical meaning.

Figure 1B:
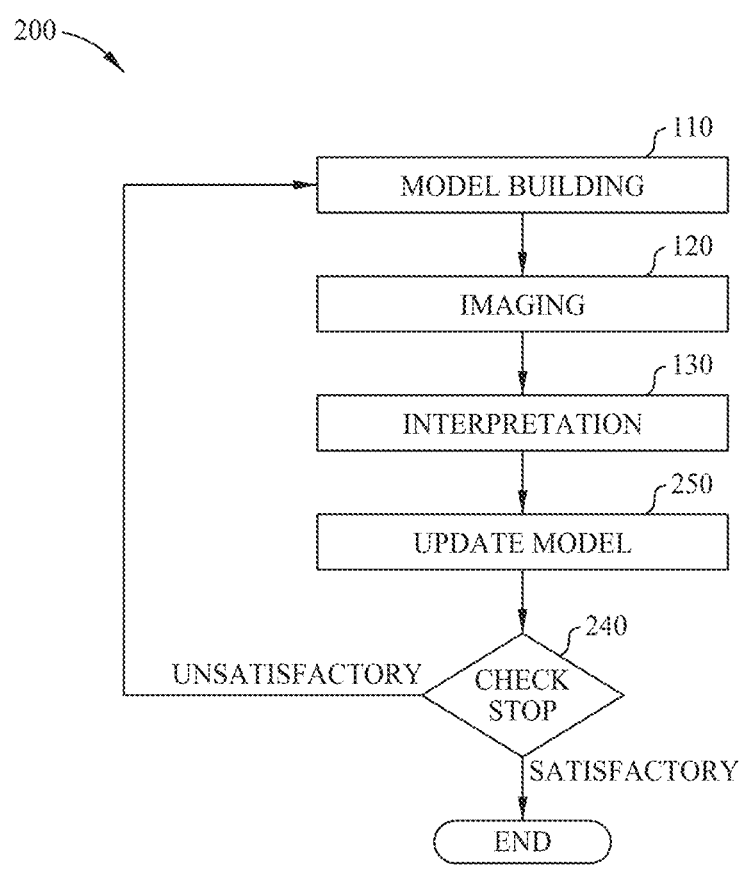
FIG. 1B illustrates another exemplary method according to embodiments disclosed herein.

FIG. 1B illustrates another exemplary seismic analysis method 200, according to embodiments disclosed herein. Similar to method 100, method 200 may include subsurface geophysical model building at block 110, imaging procedures at block 120, and interpretation (e.g., automatic interpretation, such as by ASI) at block 130. However, method 200 may update the models at block 250 prior to checking the stopping criteria at block 240. The models may thus be informed by the additional information provided by interpretation at each iteration prior to checking for satisfactory objective function values. When the stopping criteria have not been met (at block 240), the updated models (from block 250) may be utilized as control returns to the model building at block 110.

Inversion with Shape Constraints

Figure 9A:
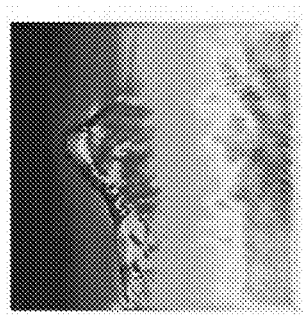
FIG. 9A illustrates a velocity model used for generating synthetic data.
Figure 9B:
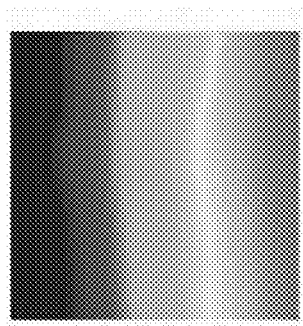
FIG. 9B illustrates an initial velocity model of FIG. 9A.
Figure 9C:
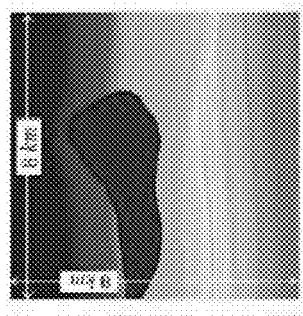
FIG. 9C illustrates an inverted velocity model, from the synthetic seismic data obtained using the velocity model of FIG. 9A, generated according to cell-based Full Wavefield Inversion.
Figure 10A:
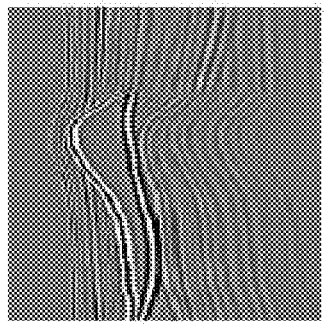
Figure 10B:
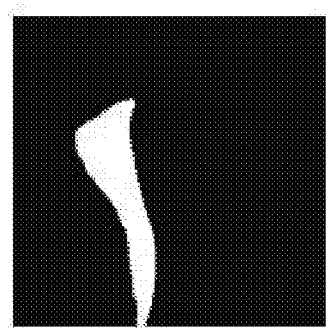
Figure 10C:
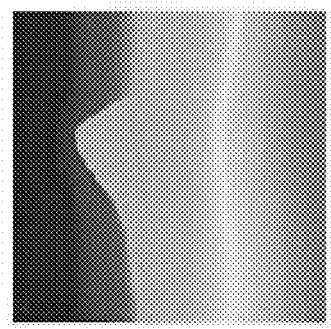
Figure 11A:
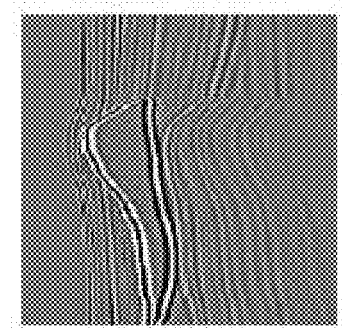
Figure 11B:
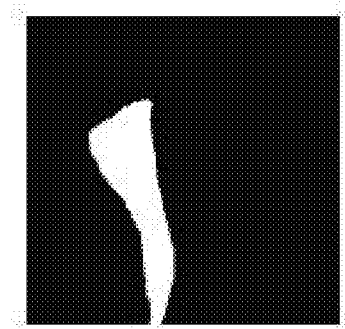
Figure 11C:
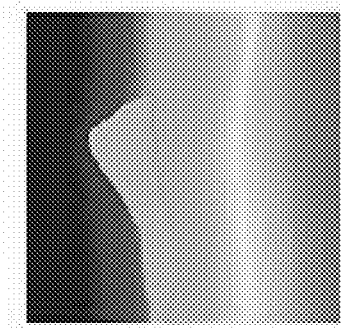
Figure 14A:
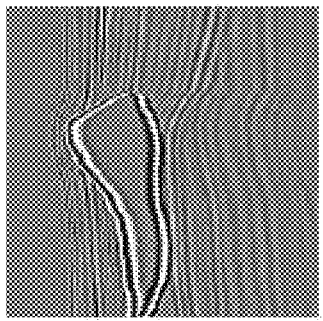
Figure 14B:
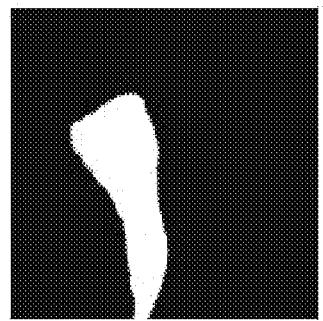
Figure 14C:
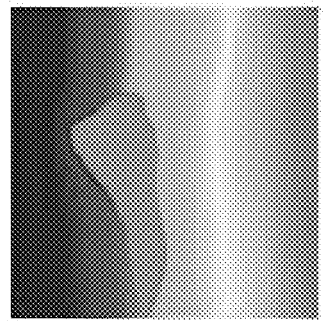
Figure 15A:
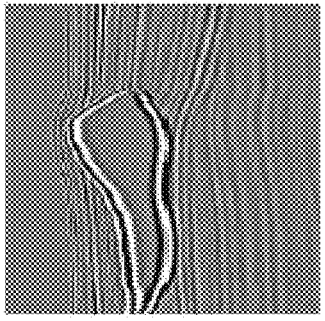
Figure 15B:
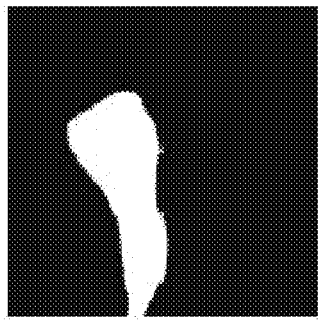
Figure 15C:
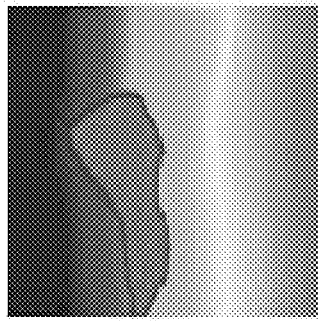

Typically, cell-based inversion techniques suffer from non-uniqueness: there exist multiple choices of parameter values which are consistent with the measured data. This non-uniqueness may be particularly pronounced when inverting for multiple geophysical parameters simultaneously (e.g., velocity, density, anisotropy). In addition, conventional inversion techniques do not determine sharp boundaries (e.g., associated with actual geologic elements), but rather set parameter values in individual cells. As a result, the inversion tends to produce blurred or soft images of geologic structures (as can be seen in FIG. 9C). Blurring may be so large that identification of key geologic elements cannot be reasonably automated. Such images may need to be manually interpreted.

Shape-constrained inversion may result in models that more naturally match the geology of the subsurface region. For example, the subsurface region may contain geologic structures. A geophysical model may represent such a geologic structure with a geobody having certain geophysical parameters (e.g., velocity, density, and anisotropy). For example, the geobody may be represented by an average value of each geophysical parameter throughout the geobody. In some embodiments, the geophysical parameters may have some degree of variance (e.g., linear) within the geobody. In some embodiments, the geophysical parameter value may be continuous across each dimension of the geobody. At an interface between adjacent geobodies, at least one geophysical parameter value may change discontinuously. In some embodiments, the geophysical model of the subsurface region is the union of the geobodies, the interfaces therebetween, and the background. In some embodiments, the background may be a cell-based representation of the subsurface region.

Extracting geologic features in addition to geophysical parameters from seismic data provides at least three distinct benefits over cell-based inversion methods. First, inversion constrained by geologic features enables inversion results to be structurally consistent across geophysical parameters. For example, the velocity model may share a common set of geologic features with the density model. Hence, it is expected that the inversion constrained by geologic features along with geophysical parameters will provide a result of greater fidelity to actual geologic elements than an inversion of cell-based geophysical parameters alone. The second benefit of inversion constrained by geologic features (in addition to geophysical parameters) is that it can reduce the number of degrees of freedom to be inverted, thereby reducing non-uniqueness. For example, when inverting seismic data to locate an anomaly of constant velocity, the cell-based FWI approach would invert for each cell separately, not taking into account the knowledge that many of the cells should share the same velocity value. In contrast, a shape-constrained inversion approach—which inverts for the shape of the anomaly, the constant or smoothly-varying velocity inside the anomaly, and the background velocity—reduces the number of degrees of freedom by taking advantage of knowledge of the anomaly. A third benefit of inverting for geologic features, in addition to geophysical parameters, is that knowledge of the location of the geologic features themselves (e.g. indicative of the locations of different geologic structures) is often of intrinsic value.

The shape-constrained inversion approach may determine the values of the geophysical parameters of given geobodies. These geobodies, along with the values of the at least one geophysical parameter within each of the geobodies, may be determined by optimizing the following objective function:

$$E(\overline{\kappa}) = \frac{1}{2} \Sigma_s^{N_s} \Sigma_r^{N_r} \int_{t_0}^{t_f} \|u(B(\overline{\kappa});x_s,x_r,t) - \overline{u}(x_s,x_r,t)\|^2 dt + \beta \Sigma_{i=1}^{N\theta} \int_{\theta_i} H(B(\overline{\kappa})) d_\Omega \quad (1)$$

where geophysical parameter $\kappa = B(\overline{\kappa})$ and refers to the discretized values of geophysical parameters within a subsurface domain $\Omega$, B is the operator for mapping parameters of geobodies to discretized values of geophysical parameters in domain $\Omega$, $\theta_i$ is the $i^{th}$ subset of the domain defining shape space, $\overline{\kappa}$ refers to geophysical parameters based on the given collection of shapes, and H is the regularization function over the geophysical parameters within shape $\theta_i$. In some embodiments, geophysical parameters within a geobody shape may be assumed to be constant, and all of the distributed values of geophysical parameters within the shape may refer to a single parameter $\overline{\kappa}_i$. In some embodiments, the values of the geophysical parameters within a shape vary smoothly, and regularization function H may be formulated to be the square of the absolute of the gradients of values (e.g. $H(\kappa) = |\overline{\nabla}_\kappa|^2$) to enforce smoothness on the values of the geophysical parameters within a shape. In other words, by enforcing smoothness, regularization function H may enforce the presence of geologic features. The shapes, and thereby operator B, may be determined by a modified seismic imaging method (e.g., seismic imaging with $L_1$ constraints) and/or a Deep Neural Network (DNN) method, as discussed below.

Automated Seismic Interpretation

One form of automatic interpretation (e.g., ASI) to identify geobodies includes a modified seismic imaging method (e.g., seismic imaging with $L_1$ constraints). Heretofore, seismic imaging with $L_1$ constraints has been typically performed with a migration operator G which relocates a reflection event from the acquisition coordinate system to the subsurface coordinate system or its equivalent travel-time coordinate system. The migration operator may be a function of geophysical parameters $\kappa$ (e.g. velocity). The migration process can be stated as follows:

$$I = G(\kappa) \overline{u}_R \quad (2)$$

where I corresponds to an image on the subsurface coordinate (for depth migration) or to an image on the depth-equivalent travel time coordinate (for time migration); and $\overline{u}_R$ is data for a reflection. An example of such migration image is given in FIG. 2A. The migration process may be converted into a reflectivity inversion problem from reflection seismic data with sparsity constraints such as:

$$R^* = \min_R \|G^T(\kappa)R - \overline{u}_R\|^2 \text{ subject to } \|R\|_1 \leq R_{max} \quad (3)$$

where R is the distributed values of the reflectivity field, $R_{max}$ is the upper bound of reflectivity in the $L_1$ norm sense, and $R^*$ is the reflectivity image which can also be considered as a boundary set separating the geobodies. This optimization problem could be solved using $L_1$-ball projection algorithms. An example of a reflectivity image produced using this approach is given in FIG. 2C. The reflectivity image may be processed to extract geobodies, such as that shown in FIG. 2B.

Another form of ASI to identify geobodies includes training a DNN to interpret subsurface images. For example, a DNN may be trained with seismic images and/or geologic models to detect geologic elements and/or interpret geologic features. The seismic images may include stacked and/or migrated seismic data, with or without additional attributes, such as semblance. The DNN may identify an artifact, or an artifact probability image or volume, that can be indicative of a geobody. For example, an artifact probability volume may be a 4D tensor which conveys a vector at each cell indicative of the likelihood that the cell belongs to a certain class or geobody. In some embodiments, the artifact or artifact probability image or volume may be further analyzed to extract geologic features.

In some embodiments, the DNN may include "layers" of weighted nodes that are activated by inputs from previous layers. These networks may be trained with examples in which the labels (e.g. correct or true outputs) are provided for a given set of inputs. In some embodiments, the training includes an optimization process by which the weight parameters of the network are determined. The optimization may seek to minimize the error between DNN prediction and label values.

Figure 3A:
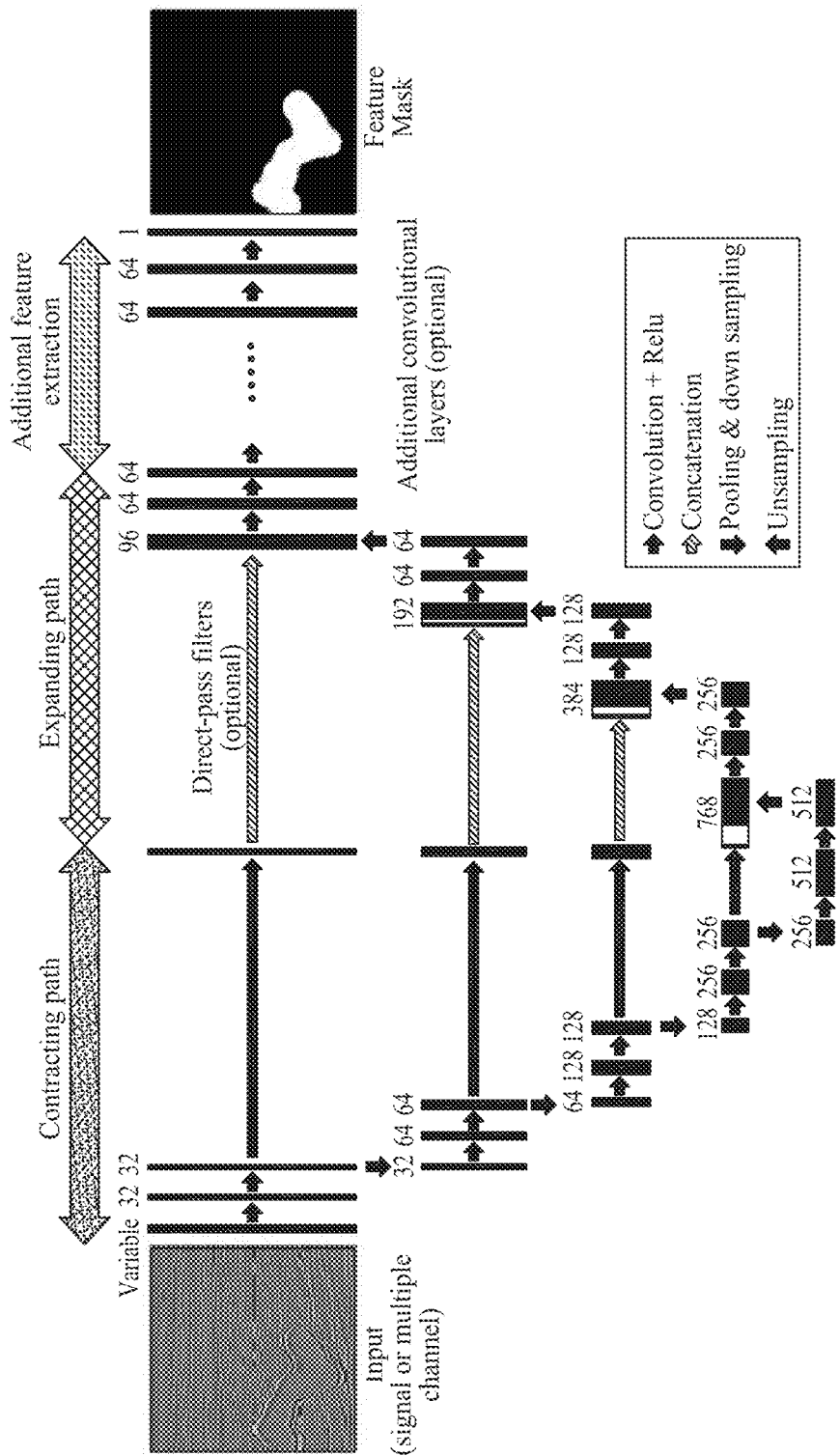
FIG. 3A illustrates an exemplary deep neural network architecture that can be used to map relationships between seismic images and geobody shapes.
Figure 3B:
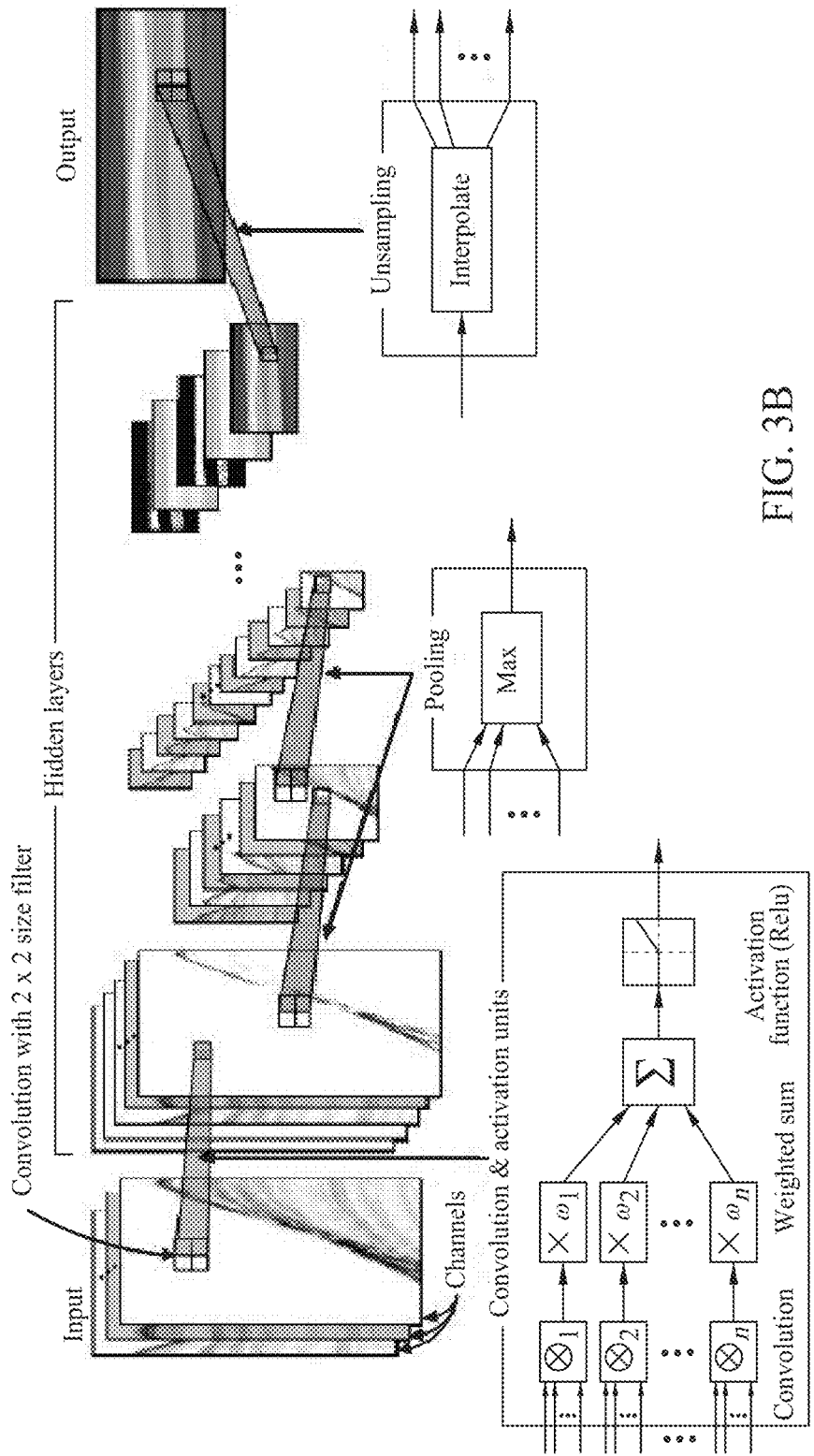
FIG. 3B illustrates basic operational units of a convolutional neural network.
Figure 6A:
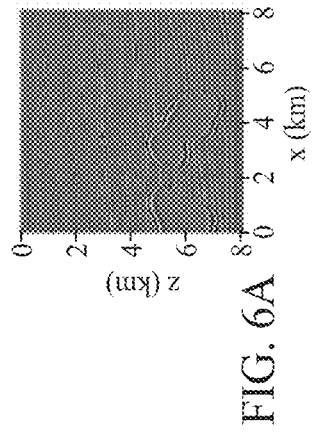
Figure 6B:
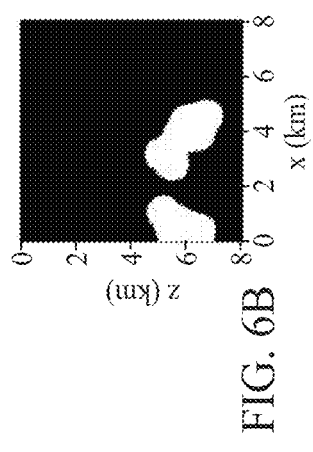
Figure 6C:
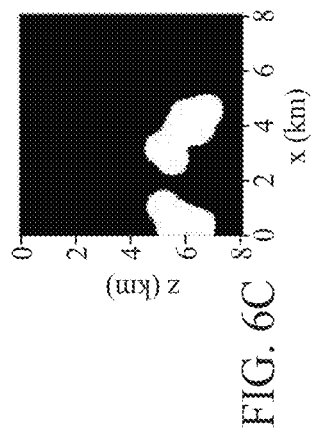
Figure 7A:
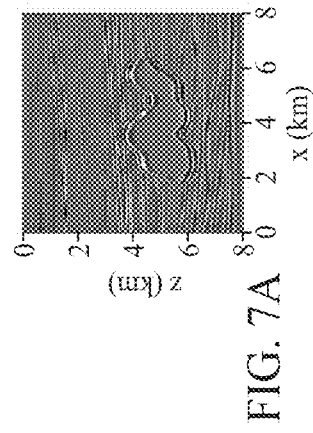
Figure 7B:
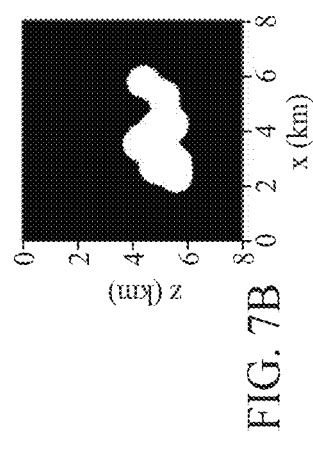
Figure 7C:
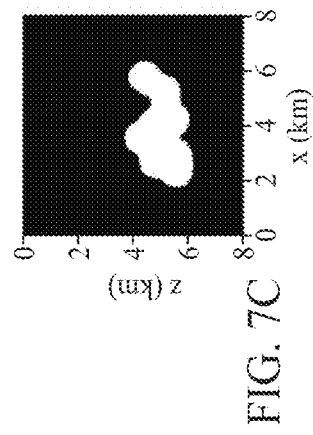
Figure 8A:
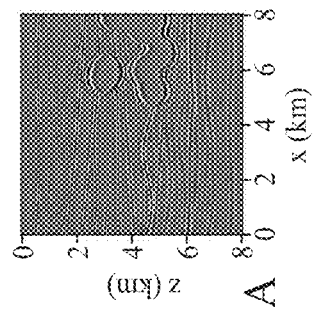
Figure 8B:
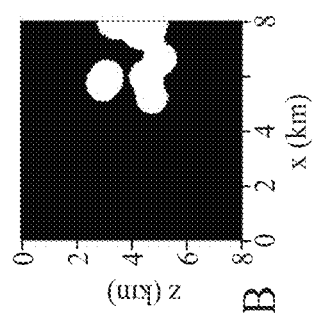
Figure 8C:
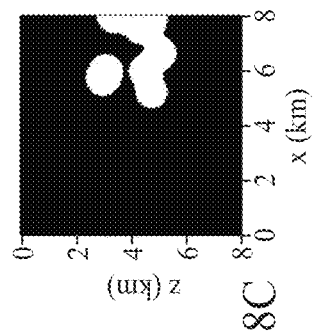

In some embodiments, the DNN may be a Convolutional Neural Network (CNN). It should be understood that CNNs are a class of DNNs that are especially well suited for processing spatial-temporal data. The CNN may be built by stacking a number of basic functional units, such as convolution, weighted-summation, activation, downsampling (also called pooling), and upsampling units. For example, FIG. 3A illustrates an exemplary deep neural network architecture that can be used to map relationships between seismic images and geobody shapes. FIG. 3B illustrates basic operational units of a CNN. As illustrated, the convolution unit may apply a discrete convolution operator on the receptive field and filter. The convolution unit may pass the results to the next operational unit. The filter coefficients used in the convolution operation may be learned during the training process. These filters may extract various artifacts of the receptive fields, such as edges or figures, or simply translate, deform, and/or rotate the receptive field. The weighted-summation units may add the input values after weighting them. If the weight values are ones for all the input values, then the convolution operation becomes a summation operation. The activation unit may be based on a function defining the output value given an input or set of inputs. The activation function may be as simple as an ON/OFF switch that depends on a threshold value. The activation functions may be nonlinear functions, such as rectified linear unit (ReLU), softsign, hyperbolic tangent (tanh) and Gaussian functions. The downsampling unit may combine values of the non-overlapping regions into one value to reduce the dimensionality of the receptive field. An example of downsampling includes applying a maximum filter on the non-overlapping subregions of the receptive field. The upsampling unit may increase the number of samples of the receptive field by interpolating the values of the receptive field.

A suitable CNN can mathematically be described by layers of nested functions:

$$Z(I,\alpha) = f_n(f_{n-1}(f_i(f_1(I,\alpha_1),\alpha_i),\alpha_{n-1}),\alpha_n) \quad (4)$$

where I is the input image, $i \in [1, n]$, n is the number of layers, and $\alpha = \{\alpha_1, \alpha_i, \ldots \alpha_n\}$ is a tuple of all the filter coefficients in which $\alpha_i$ is the $i^{th}$ layer filter coefficients. Suitable CNNs can take inputs of arbitrary size and produce correspondingly-sized outputs with efficient inference and learning. A fully convolutional neural network may be made up of a select set of operations that can be applied to inputs of any size, including operations like convolution, pooling, upsampling, concatenating channels, adding channels, etc. In some embodiments, CNNs may have some convolutional layers followed by a layer that vectorizes many or all of the layers and then uses a multi-layer perceptron network to do the final classification task. In some embodiments, a multi-layer perceptron may be suitable. However, some multi-layer perceptrons may only handle a fixed number of inputs (hence a fixed number of cells), and may not be suitable for input images of varying sizes, such as subsurface images. In some embodiments, a fully convolutional neural network may be ideally suited to spatially-dense prediction tasks, such as seismic artifact interpretation via cell-based labeling. In some embodiments, the training set may be a 2D training set, a 3D training set, or a combination thereof.

An exemplary embodiment may be based on "U-net" network architecture. For example, U-net architecture may be modified for effectively solving the ASI problem. As illustrated in FIG. 3A, such a U-net architecture may have the desirable feature of fusing information from multiple scales to increase the accuracy in image segmentation. Each black rectangular box in FIG. 3A corresponds to a multi-channel (filter) feature map. The number of the channels is denoted at the top of each box. The values of filter coefficients are not fixed, but are rather learned from the data. The white boxes represent copied feature maps. The arrows denote the different operations given in the legend of FIG. 3A.

A modified U-net architecture is shown in FIG. 3A. The modified U-net architecture may include a contracting path followed by an expansive path and additional convolutional layers (e.g., at higher resolutions). The contracting path may include repeated application of 3×3 convolutions followed by a ReLU and downsampling (e.g., using max pooling or strided convolutions) operation. The number of convolutional filters in each layer and the scale of down-sampling may be set by the user, predetermined, or automatically updated. Every step in the expansive path may include an upsampling of the feature map followed by a 2×2 convolution, a concatenation with the corresponding cropped feature maps from the contracting path, and multiple 3×3 convolutions, each followed by a ReLU. The cropping may be used due to the loss of border pixels if padding is not used. Finally, multiple convolutional layers (or residual layers) may be added at a resolution equivalent to the input image. When multiple convolutional layers are directly connected through skip connections to bypass some layers, this architecture may be referred to as a densely-connected architecture (also referred to as "DenseNet"). As a special case of the DenseNet architecture, residual network architecture (also referred to as "ResNet") skips over a single layer. At the final layer, a 1×1 convolution may be used to map each multi-component feature vector to the desired number of classes. This vectorized output of the network at each cell may be stored at the location of cell to generate a 4D tensor that is the feature probability volume. The outputs may occur in different orientations, depending on the training scheme. In this particular approach, the network was trained in x, y, z directions. Therefore, the results may be fused to provide the final combined feature (e.g. fault or salt geobody) probability volume in 3D.

Some embodiments may make use of other fully convolutional DNN architectures other than U-net architecture. Some embodiments may include an ensemble of DNNs in which each network can have a different architecture and/or be trained with a different dataset. For example, multiples of networks may be used by designing networks in which each network processes 3D subsurface image volumes slice-by-slice along a direction (e.g. x,y,z directions), and then fusing all the directional prediction values (e.g. maximum of the prediction values along x,y,z directions). As another example, multiple networks may be used by training different networks to detect features at different scales (e.g., one network may look at patches of size 128×128 pixels, while another network looks at patches of size 512×512 pixels).

Architectures similar to U-net architectures typically have the majority of computational costs during the training of the network. Once the convolutional neural network is trained, predictions can be produced for entire slices (in 2D) or volumes (in 3D) in a fraction of the training time. The accuracy of such a network can be significantly better than traditional approaches that are not based on deep learning. The efficiency of such a network can be significantly better than prior pixelwise classification using deep learning approaches for seismic interpretation, using a few orders of magnitude less time for predictions. ASI with DNN (e.g. fully convolutional neural networks) may be both more accurate in predictions and more efficient with interpretation time.

Below is a discussion of exemplary steps that can be used to implement ASI with DNN. Not all steps may be necessary in every embodiment.

To train a fully convolutional DNN, data, such as multiple pairs of input seismic and target label patches or volumes, may be generated and/or provided. A "patch" refers to an extracted portion of a seismic image (2D or 3D) that represents the region being analyzed by the network. The patch may contain sufficient information and context for the network to recognize the features of interest. This may be done by extracting patches of sufficient size from acquired seismic data (e.g., FIG. 2A) with manually-interpreted feature (e.g., fault or salt geobody) masks as labels (e.g., the geobodies of FIG. 2B). In some embodiments, synthetic data may be used to build appropriate property volumes and artificially introduce geobodies (e.g., salt bodies). The seismic image may be generated from a synthetic volume using wave propagation models or convolution models. Image augmentation (e.g., mirroring the data, rotating the data, etc.) may be used to make the training data cover a wider region of applicability. FIGS. 4A-8C show examples of testing images, manual interpretations and ASI predictions. FIGS. 4A, 5A, 6A, 7A, and 8A illustrate synthetically-generated subsurface images. FIGS. 4B, 5B, 6B, 7B, and 8B illustrate manually-interpreted salt-body labels for each migration image. FIGS. 4C, 5C, 6C, 7C, and 8C illustrate ASI generated salt-body labels for each subsurface image.

Training a fully convolutional DNN may involve learning millions of parameters that define the filters applied to the input data at various scales. The network may learn those millions of parameters by optimizing the value of the parameters to minimize a discrepancy measure based on comparing network predictions with the training material provided by the user. The discrepancy measure could include a number of standard loss functions used in machine learning such as pixel/voxel-wise losses (e.g., "squared loss," "absolute loss," "binary cross-entropy," "categorical cross entropy"), and/or losses that look at larger regions such as "adversarial loss." Often, this very large scale optimization problem may be used with specialized hardware (e.g., GPU workstations or high performance computers) to train models in a reasonable time frame (e.g., hours to days). Specifically, an exemplary training procedure may include using a specific variant of stochastic gradient descent optimization with data parallelism using multiple GPUs wherein several data samples are evaluated on each GPU. Gradient estimates from all the GPUs may be averaged to get batch gradient estimates used by the optimizer. Many standard neural network training options (such as drop-out regularization, batch-norm, etc.) can be used to improve the quality of trained models.

Training data for a DNN may in various embodiments include synthetically generated subsurface physical property models consistent with provided geological priors. The computer-simulated data may be based on the governing equations of geophysics and the generated subsurface physical property models. The training data for the DNN may include migrated or stacked geophysical data (e.g., seismic) with interpretations done manually. The DNN may be trained using a combination of synthetic and acquired geophysical data.

In some embodiments (e.g., 2D networks), patches may be extracted along all three orthogonal directions. A different DNN may be trained for views along each direction. The results from these DNNs may be fused to provide a final probability volume in 3D. For example, 3D networks may be robust to such variation in data view (e.g., there are multiple ways to slice a 3D patch into 2D patches (side view, top view, etc.), but only one way to look at a 3D patch).

In some embodiments, a trained DNN (or ensemble of trained DNNs) may be used to interpret the shape of a geobody (e.g., salt body) from subsurface images (e.g., images from the imaging of block 120 of methods 100, 200 of FIGS. 1A-B). In some embodiments, DNN(s) may be used for interpretation at block 130 of methods 100, 200 of FIGS. 1A-B during one or more iterations. For example, a migrated seismic image (based on the current estimate of the geologic model, such as a velocity model) may be input to the DNN(s), and a quick forward-pass of the DNN(s) may produce a pixel/voxel-wise output vector with the probability of each pixel/voxel belonging to the library of geobodies.

EXAMPLE

In an example, a geologic structure is modeled as a geobody. In some examples, the geobody may be a region of anomalous values, such as velocity amplitude. FIG. 9A illustrates the geobody located approximately in the middle of a domain. In this example, available data includes pressure measurements recorded at 200 seismic receivers located along the earth's surface. Synthetic measurements at the receiver locations have been generated for 100 sources, each with 5 Hz Ricker temporal signatures. In this example, both source locations and receiver locations are spread equidistantly on the earth's surface. FIG. 9B illustrates the initial velocity model used for inversion in this example. Note that the initial velocity model does not show the geobody, and the background is smoothed. The image for the initial model is shown in FIG. 2A, and the interpreted salt body for the initial model is shown in FIG. 2B. FIGS. 10A-15C illustrate the iterations of depth migration images (FIGS. 10A-15A), ASI of predicted geobodies (FIGS. 10B-15B), and velocity model updates (FIGS. 10C-15C) from iterations 5, 10, 20, 30, 40, and 50, respectively. For this example, velocity has been assumed to be constant across the geobody. The model improvements over existing methods can be seen by comparing FIG. 9C (the cell-based FWI result) to FIG. 15C (the ASI-guided inversion approach). Using ASI-guided inversion, large, anomalous salt bodies may be detected and determined without any further interpretation process.

In practical applications, the present technological advancement may be used in conjunction with a seismic data analysis system (e.g., a high-speed computer) programmed in accordance with the disclosures herein. Preferably, in order to efficiently perform FWI, the seismic data analysis system is a high performance computer ("HPC"), as known to those skilled in the art. Such high performance computers typically involve clusters of nodes, each node having multiple CPUs and computer memory that allow parallel computation. The models may be visualized and edited using any interactive visualization programs and associated hardware, such as monitors and projectors. The architecture of the system may vary and may be composed of any number of suitable hardware structures capable of executing logical operations and displaying the output according to the present technological advancement. Those of ordinary skill in the art are aware of suitable supercomputers available from Cray or IBM.

Figure 16:
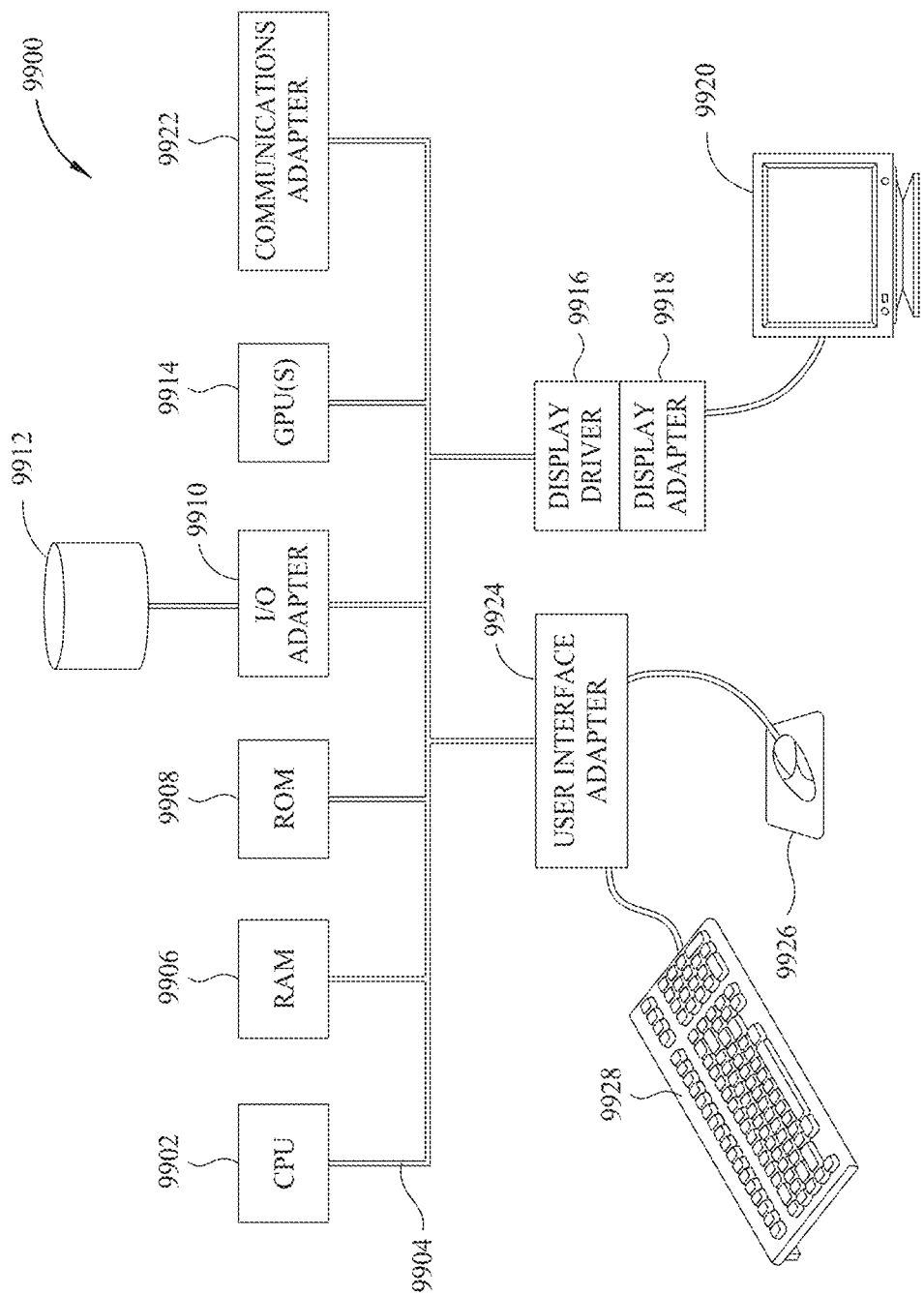
FIG. 16 illustrates a block diagram of a data analysis system upon which the present technological advancement may be embodied.

FIG. 16 illustrates a block diagram of a seismic data analysis system 9900 upon which the present technological advancement may be embodied. A central processing unit (CPU) 9902 is coupled to system bus 9904. The CPU 9902 may be any general-purpose CPU, although other types of architectures of CPU 9902 (or other components of exemplary system 9900) may be used as long as CPU 9902 (and other components of system 9900) supports the operations as described herein. Those of ordinary skill in the art will appreciate that, while only a single CPU 9902 is shown in FIG. 16, additional CPUs may be present. Moreover, the system 9900 may comprise a networked, multi-processor computer system that may include a hybrid parallel CPU/GPU system. The CPU 9902 may execute the various logical instructions according to various teachings disclosed herein. For example, the CPU 9902 may execute machine-level instructions for performing processing according to the operational flow described.

The seismic data analysis system 9900 may also include computer components such as non-transitory, computer-readable media. Examples of computer-readable media include a random access memory ("RAM") 9906, which may be SRAM, DRAM, SDRAM, or the like. The system 9900 may also include additional non-transitory, computer-readable media such as a read-only memory ("ROM") 9908, which may be PROM, EPROM, EEPROM, or the like. RAM 9906 and ROM 9908 hold user and system data and programs, as is known in the art. The system 9900 may also include an input/output (I/O) adapter 9910, a communications adapter 9922, a user interface adapter 9924, and a display adapter 9918; the system 9900 may potentially also include one or more graphics processor units (GPUs) 9914, and one or more display drivers 9916.

The I/O adapter 9910 may connect additional non-transitory, computer-readable media such as storage device(s) 9912, including, for example, a hard drive, a compact disc ("CD") drive, a floppy disk drive, a tape drive, and the like to seismic data analysis system 9900. The storage device(s) may be used when RAM 9906 is insufficient for the memory requirements associated with storing data for operations of the present techniques. The data storage of the system 9900 may be used for storing information and/or other data used or generated as disclosed herein. For example, storage device(s) 9912 may be used to store configuration information or additional plug-ins in accordance with the present techniques. Further, user interface adapter 9924 couples user input devices, such as a keyboard 9928, a pointing device 9926 and/or output devices to the system 9900. The display adapter 9918 is driven by the CPU 9902 to control the display on a display device 9920 to, for example, present information to the user. For instance, the display device may be configured to display visual or graphical representations of any or all of the models discussed herein. As the models themselves are representations of geophysical data, such a display device may also be said more generically to be configured to display graphical representations of a geophysical data set, which geophysical data set may include the models described herein, as well as any other geophysical data set those skilled in the art will recognize and appreciate with the benefit of this disclosure.

The architecture of seismic data analysis system 9900 may be varied as desired. For example, any suitable processor-based device may be used, including without limitation personal computers, laptop computers, computer workstations, and multi-processor servers. Moreover, the present technological advancement may be implemented on application specific integrated circuits ("ASICs") or very large scale integrated ("VLSI") circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the system 9900 may include various plug-ins and library files. Input data may additionally include configuration information.

Seismic data analysis system 9900 may include one or more machine learning architectures, such as deep neural networks and convolutional neural networks. The machine learning architectures may be trained on various training data sets. The machine learning architectures may be applied to analysis and/or problem solving related to various unanalyzed data sets. In should be appreciated that the machine learning architectures perform training and/or analysis that exceed human capabilities and mental processes. The machine learning architectures, in many instances, function outside of any preprogrammed routines (e.g., varying functioning dependent upon dynamic factors, such as data input time, data processing time, data set input or processing order, and/or a random number seed). Thus, the training and/or analysis performed by machine learning architectures is not performed by predefined computer algorithms and extends well beyond mental processes and abstract ideas.

The above-described techniques, and/or systems implementing such techniques, can further include hydrocarbon management based at least in part upon the above techniques. For instance, methods according to various embodiments may include managing hydrocarbons based at least in part upon subsurface region maps constructed according to the above-described methods. In particular, such methods may include drilling a well, and/or causing a well to be drilled, based at least in part upon the seismic analysis with ASI-guided inversion (e.g., such that the well is located based at least in part upon a location determined from the subsurface region maps, which location may optionally be informed by other inputs, data, and/or analyses, as well) and further prospecting for and/or producing hydrocarbons using the well.

The foregoing description is directed to particular example embodiments of the present technological advancement. It will be apparent, however, to one skilled in the art, that many modifications and variations to the embodiments described herein are possible. All such modifications and variations are intended to be within the scope of the present disclosure, as defined in the appended claims.

The invention claimed is:

1. A method of seismic analysis, the method comprising:
obtaining an initial geophysical model of a subsurface region;
obtaining seismic data for the subsurface region;
producing a subsurface image of the subsurface region with the seismic data and the geophysical model;
generating a map of one or more geologic features of the subsurface region by automatically interpreting the subsurface image;
determining whether to iterate; and
responsive to determining to iterate, automatically iteratively updating the geophysical model, subsurface image, and map of geologic features by:

returning to model building by automatically building an updated geophysical model based on the geophysical model of a prior iteration constrained with a shape of at least one geobody in an updated map of geological features from the prior iteration, wherein the updated geophysical model is consistent with the seismic data used across iterations and wherein the updated geophysical model is both cell-based and includes the at least one geobody;

automatically imaging the seismic data with the updated geophysical model to produce an updated subsurface image; and automatically interpreting the updated subsurface image to generate the updated map of geologic features for use in subsequent iteration.

2. The method of claim 1, wherein, for at least one iteration, building the updated geophysical model comprises at least one of Full Wavefield Inversion (FWI) and seismic tomography.

3. The method of claim 1, wherein, for at least one iteration, imaging the seismic data with the updated geophysical model comprises at least one of post-stack migration, pre-stack time migration, pre-stack depth migration, reverse-time migration, gradient-based tomography, and gradient-based FWI methods.

4. The method of claim 1, wherein, for at least one iteration, the updated subsurface image comprises at least one of a post-stack migration image, a pre-stack time migration image, a reverse-time migration image, an FWI gradient image, and a tomography gradient image.

5. The method of claim 4, wherein the FWI gradient image is based on at least one of short-offset impedance gradients, short-offset density gradients, and short-offset reflectivity gradients.

6. The method of claim 1, wherein the geologic features comprise a plurality of geobodies and interfaces therebetween; and wherein at least one of the geobodies comprises at least semicontiguous cells in the geophysical model, the at least semi-contiguous cells comprising a plurality of cells in each of three-dimension, and the geobody having a parameter value that is continuous across each of the plurality of cells.

7. The method of claim 1, wherein the geologic features comprise a plurality of geobodies and interfaces therebetween, and wherein, at one or more of the interfaces, a parameter value varies discontinuously in the geophysical model in at least one direction.

8. The method of claim 1, wherein, for at least one iteration, automatically interpreting the updated subsurface image comprises Automated Seismic Interpretation (ASI).

9. The method of claim 8, wherein the ASI comprises training a Deep Neural Network (DNN) to interpret the subsurface images.

10. The method of claim 9, wherein the DNN comprises a fully-convolutional neural network.

11. The method of claim 10, wherein the fully-convolutional neural network comprises one or more of: U-net architecture, densely-connected network architecture, residual network architecture, and combinations of any two or more of the foregoing.

12. The method of claim 9, wherein the DNN comprises a recurrent neural network.

13. The method of claim 1, wherein the seismic data comprises seismic shot gathers, and the initial geophysical model comprises a subsurface velocity model.

14. The method of claim 1, wherein, for at least one iteration, building the updated geophysical model based on the geophysical model of a prior iteration constrained with a shape of at least one geobody in an updated map of geological features from the prior iteration comprises at least one of:

using a shape-constrained inversion method;

reparameterization of variables conforming to the geologic features; and using regularization terms to enforce presence of the geologic features.

15. The method of claim 1, further comprising displaying the updated map of geologic features.

16. The method of claim 1, further comprising managing hydrocarbons based at least in part upon the updated map of geologic features.

17. The method of claim 1, wherein the model building comprises shape-constrained inversion that is constrained with the shape of the at least one geobody from the updated map of geological features from the prior iteration.

18. A geophysical data analysis system, comprising:

a processor; and a display configured to display graphical representations of a geophysical data set, wherein the geophysical data analysis system is configured to:

obtain an initial geophysical model of a subsurface region;

obtain seismic data for the subsurface region;

produce a subsurface image of the subsurface region with the seismic data and the geophysical model;

generate a map of one or more geologic features of the subsurface region by automatically interpreting the subsurface image;

determine whether to iterate; and responsive to determining to iterate, iteratively update the geophysical model, subsurface image, and map of geologic features by:

returning to model building by automatically building an updated geophysical model based on the geophysical model of a prior iteration constrained with a shape of at least one geobody in an updated map of geological features from the prior iteration, wherein the updated geophysical model is consistent with the seismic data used across iterations and wherein the updated geophysical model is both cell-based and includes the at least one geobody;

automatically imaging the seismic data with the updated geophysical model to produce an updated subsurface image;

automatically interpreting the updated subsurface image to generate an updated map of geologic features; and display, via said display, a visual representation of the updated map of geologic features.

19. The geophysical data analysis system of claim 18, wherein the geophysical data analysis system is configured to build the updated geophysical model by shape-constrained inversion that is constrained with the shape of the at least one geobody from the updated map of geological features from the prior iteration.

20. An improved method for generating an image of a subsurface region, the improvement of which comprises: building an updated geophysical model based on a geophysical model of a prior iteration constrained with a shape of at least one geobody in an updated map of geological features of the subsurface region from the prior iteration, the method comprising:
  obtaining an initial geophysical model of the subsurface region;
  obtaining seismic data for the subsurface region;
  producing a subsurface image of the subsurface region with the seismic data and the geophysical model;
  generating a map of the geologic features by automatically interpreting the subsurface image;
  determining whether to iterate; and
  responsive to determining to iterate, iteratively updating the geophysical model, subsurface image, and map of geologic features by:
    returning to model building by automatically building an updated geophysical model based on the geophysical model of a prior iteration constrained with the shape of the at least one geobody in the updated map of geological features from the prior iteration, wherein the updated geophysical model is consistent with the seismic data used across iterations and wherein the updated geophysical model is both cell-based and includes the at least one geobody;
    automatically imaging the seismic data with the updated geophysical model to produce an updated subsurface image; and
    automatically interpreting the updated subsurface image to generate an updated map of geologic features for use in building the updated geophysical model in a subsequent iteration.

21. The improved method of claim 20, wherein the model building comprises shape-constrained inversion that is constrained with the shape of the at least one geobody from the updated map of geological features from the prior iteration.

\* \* \* \* \*

UNITED STATES PATENT AND TRADEMARK OFFICE
CERTIFICATE OF CORRECTION

| | |
|---|---|
| PATENT NO. | : 11,693,139 B2 |
| APPLICATION NO. | : 16/685312 |
| DATED | : July 4, 2023 |
| INVENTOR(S) | : Huseyin Denli et al. |

It is certified that error appears in the above-identified patent and that said Letters Patent is hereby corrected as shown below:

In the Claims (Claim 20; Lines 12-13):
"for use in building the updated geophysical model in a subsequent iteration."
Should be replaced with:
"for use in a subsequent iteration."

Signed and Sealed this
Nineteenth Day of March, 2024

Katherine Kelly Vidal
*Director of the United States Patent and Trademark Office*